F. L. SNIVELY.
LIFTING JACK FOR AUTOMOBILES.
APPLICATION FILED JAN. 15, 1917.
1,227,973.
Patented May 29, 1917.
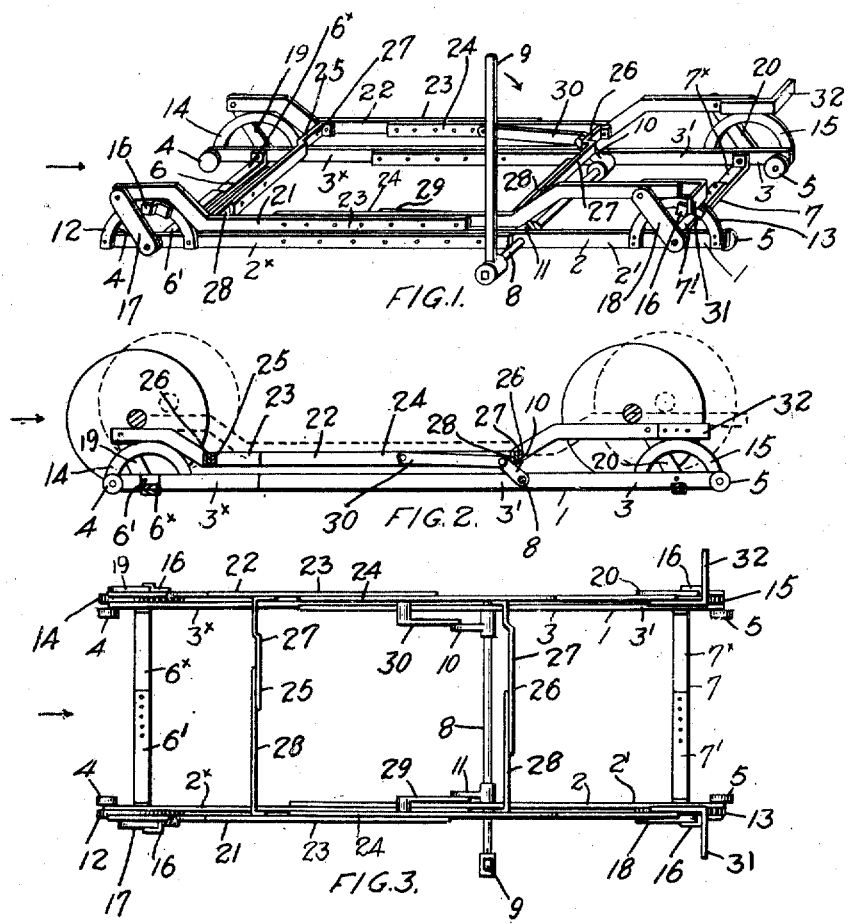
INVENTOR
FLORENTINE L. SNIVELY
by
ATTY

UNITED STATES PATENT OFFICE.

FLORENTINE LAFAYETTE SNIVELY, OF DUNNVILLE, ONTARIO, CANADA.

LIFTING-JACK FOR AUTOMOBILES.

1,227,973. Specification of Letters Patent. Patented May 29, 1917.

Application filed January 15, 1917. Serial No. 142,537.

*To all whom it may concern:*

Be it known that I, FLORENTINE LAFAYETTE SNIVELY, of the town of Dunnville, in the county of Haldimand, in the Province of Ontario, Canada, have invented certain new and useful Improvements in Lifting-Jacks for Automobiles, of which the following is the specification.

My invention relates to improvements in lifting jacks for automobiles and the object of the invention is to devise a simple device whereby an automobile may be raised bodily from the ground, such means being operated automatically either by the impetus of the car engaging with the device or by simple manual means as desired and such as may be readily and quickly adapted to move any size of car and such as may be easily and quickly moved from place to place whenever desired and it consists essentially of the following arrangement and construction of parts as hereinafter more particularly explained by the following specification.

Figure 1, is a general perspective view of my device.

Fig. 2, is a longitudinal section through my device.

Fig. 3, is a plan view.

In the drawings like letters of reference indicate corresponding parts in each figure.

1 indicates the bed of the machine which comprises longitudinal bars 2 and 3 each divided centrally of its length into two portions 2ˣ and 2′ and 3ˣ and 3′, the divided portions overlapping each other as indicated and provided with a series of alined holes through which the securing bolts pass. By this means the bars 2 and 3 may be adjusted longitudinally to any length desired. The ends of the bars 2 and 3 are mounted on rollers 4 and 5. The members 2ˣ and 3ˣ of the bars 2 and 3 are connected together by a cross bar 6 comprising two members 6ˣ and 6′ overlapping each other and provided with a series of alined orifices through which securing bolts pass. The members 2′ and 3′ of the bars 2 and 3 are connected together by a cross bar 7 comprising the members 7ˣ and 7′ also overlapping and provided with a series of alined orifices.

By adjusting the members of the cross bars 6 and 7 longitudinally of each other the width of the main frame or bed may be adjusted to the width of the car.

8 indicates a rocking shaft journaled in the longitudinal bars 2 and 3 intermediately of their length. 9 indicates an operating lever secured to the shaft 8. 10 and 11 indicate crank arms also secured to the shaft 8 within the side bars 2 and 3. 12 and 13 indicate semi-circular bar members secured to the ends of the bar 2 so as to project upwardly therefrom. 14 and 15 indicate bar members similar to the bar members 12 and 13 and secured to the end of the longitudinal bar 3. 16 indicates a stop bracket carried by each of the semi-circular bar members 12, 13, 14 and 15 on their outer face. 17 and 18 indicate links pivotally swung at their lower ends on the bar 2 in proximity to each end thereof. 19 and 20 indicate links swung upon the corresponding ends of the bar 3. 21 and 22 indicate the side bars of the lifting frame. The bar 21 is comprised by members 23 and 24, the inner approaching overlapping ends of which are depressed thereby forming a side bar having a centrally depressed portion connected together and provided with a series of alined orifices by which the members may be adjusted longitudinally one of the other. The side bar 22 is constructed similarly to the side bar 21, the side bars 21 and 22 being connected together by cross bars 25 and 26. Each cross bar 25 and 26 is formed by two members 27 and 28 overlapping each other at their inner ends, such overlapping ends being provided with a series of alined orifices through which bolts pass to adjustably connect the members together. 29 and 30 indicate links extending from the outer end of the crank arms 10 and 11 and connected at their opposite ends to the side bars 21 and 22 of the lifting frame. 31 and 32 indicate right angular members secured to the ends of the side bars 21 and 22 of the lifting frame, the right angular arm of which extends outwardly from each side of the apparatus.

When the device is used it is placed in a suitable position upon the floor and the car driven in the direction of arrow so that the wheels of the car pass to each outer side of the side bars 2 and 3. The apparatus may be held by any suitable means in a stationary position while the car is passing thereover and as the car passes rearwardly the wheels come into contact with the outwardly extending portions of the brackets 31 and 32 carrying these brackets in a corresponding direction and thereby drawing the side bars 21 and 22 in a similar direction. As they are thrown in such direction they are carried upwardly by means of the swinging links 17, 18, 19 and 20 into contact with the axles of the car lifting such axles and carrying the wheels of the car clear of the ground.

If it is not possible to hold the apparatus in a stationary position so that the device may be operated in this way the car may be driven into a position over the apparatus as above described and the lever 9 swung in the direction of arrow thereby pulling the side bars 21 and 22 longitudinally by means of the cranks 10 and 11 and links 29 and 30, the side bars 21 and 22 being at the same time elevated by the links 17, 18, 19 and 20 as above described. The longitudinal movement of the side bars 21 and 22 is limited by the links 17, 18, 19 and 20 after passing over the vertical center line coming in contact with the bracket 16 thereby permanently holding the car in the elevated position. The whole apparatus may be then moved to any desired position by being carried on the rollers 4 and 5.

From this description it will be seen that I have devised a very simple device whereby a car may be readily and easily lifted from the ground for the purpose of removing all weight from the tires so that any cleansing operation or repairs may be easily and quickly accomplished and such a device as may be easily adjusted so as to fit any size or make of car to be lifted thereby.

What I claim as my invention is:

A lifting jack for automobiles comprising a base frame, link members swung upon the base frame, a lifting frame carried by the links, right angular brackets extending horizontally outwardly from each side of the lifting frame and against which the wheels of the car are designed to have impact, bracket members carried by each end of the base frame and on which the lifting frame normally rests, and stop members extending outwardly from such bracket members and with which the links of the lifting frame engage when the lifting frame is carried to the lifted position.

FLORENTINE LAFAYETTE SNIVELY.

Witnesses:
GLADYS SMITH,
GEO. L. GOODROW.

Copies of this patent may be obtained for five cents each, by addressing the "Commissioner of Patents, Washington, D. C."